(12) United States Patent
Millner et al.

(10) Patent No.: US 9,718,701 B2
(45) Date of Patent: Aug. 1, 2017

(54) METHOD AND DEVICE FOR REDUCING IRON OXIDE-CONTAINING FEEDSTOCKS

(71) Applicant: PRIMETALS TECHNOLOGIES AUSTRIA GMBH, Linz (AT)

(72) Inventors: Robert Millner, Loosdorf (AT); Gerald Rosenfellner, St. Peter/Au (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 339 days.

(21) Appl. No.: 14/377,034

(22) PCT Filed: Jan. 17, 2013

(86) PCT No.: PCT/EP2013/050789
§ 371 (c)(1),
(2) Date: Aug. 6, 2014

(87) PCT Pub. No.: WO2013/120645
PCT Pub. Date: Aug. 22, 2013

(65) Prior Publication Data
US 2015/0004081 A1    Jan. 1, 2015

(30) Foreign Application Priority Data
Feb. 13, 2012 (EP) .................................. 12155090

(51) Int. Cl.
*C01G 49/02*    (2006.01)
*C21B 13/00*    (2006.01)

(52) U.S. Cl.
CPC .......... *C01G 49/02* (2013.01); *C21B 13/0073* (2013.01); *Y02P 10/122* (2015.11);
(Continued)

(58) Field of Classification Search
CPC ... C01G 49/02; C21B 13/0073; Y02P 10/122; Y02P 10/126; Y02P 10/128; Y02P 10/136; Y02P 10/265; Y02P 10/283
See application file for complete search history.

(56) References Cited

U.S. PATENT DOCUMENTS

| 4,861,369 A | 8/1989 | von Bogdandy ................. 75/38 |
| 2009/0013828 A1 | 1/2009 | Martinis et al. |

(Continued)

FOREIGN PATENT DOCUMENTS

| EP | 0269609 A1 | 6/1988 |
| EP | 0388395 A1 | 9/1990 |

(Continued)

OTHER PUBLICATIONS

International Search Report dated May 21, 2013 issued in corresponding International patent application No. PCT/EP2013/050789.

(Continued)

*Primary Examiner* — Jessee Roe
*Assistant Examiner* — Jenny Wu
(74) *Attorney, Agent, or Firm* — OSTROLENK FABER LLP

(57) ABSTRACT

A method and a device for reducing iron-oxide-containing feedstocks, in which a reducing gas is fed to a reducing unit (1) containing the iron-oxide-containing feedstocks. The reducing gas is generated by introducing a process gas having reduction potential into a heating appliance (3) for heating the process gas, which is withdrawn as reducing gas therefrom. In the heating appliance (3), heat energy is transferred to the process gas. The heat energy is formed by combustion of a fuel gas containing organic substances, including coke oven gas with addition of technically pure oxygen. The flames of the combustion have an adiabatic flame temperature of above 1000° C., wherein, in the (Continued)

combustion of the fuel gas, at least some of the organic substances present in the fuel gas are cracked.

9 Claims, 2 Drawing Sheets

(52) U.S. Cl.
CPC ........... *Y02P 10/126* (2015.11); *Y02P 10/128* (2015.11); *Y02P 10/136* (2015.11); *Y02P 10/265* (2015.11); *Y02P 10/283* (2015.11)

(56) References Cited

U.S. PATENT DOCUMENTS

| 2011/0247457 A1 | 10/2011 | Knop et al. |
| 2011/0283837 A1 | 11/2011 | Millner et al. |
| 2013/0154166 A1* | 6/2013 | Kepplinger ............... C21B 5/00 266/44 |

FOREIGN PATENT DOCUMENTS

| EP | 0488429 A2 | 6/1992 |
| RU | 2381207 C2 | 2/2010 |
| WO | WO 2009/037587 A2 | 3/2009 |
| WO | WO 2010/042023 A1 | 4/2010 |

OTHER PUBLICATIONS

International Preliminary Report on Patentability dated Jun. 27, 2014 issued in corresponding International patent application No. PCT/EP2013/050789.
Wright Keith; "Coke oven Gas Treatmentar, Liquor, Ammonia"; The Coke Oven Managers Year-Book 2003; pp. 221-257; XP007921868; 2003; Dec. 31, 2003.
J. M. Beer, et al., "Impinging Jet Flames", Dec. 1968, vol. 12, pp. 575-586.
Chinese Office Action, dated May 20, 2015, issued in corresponding Chinese Patent Application No. 201380009205.X. English translation. Total 18 pages.
Decision on Grant dated Jan. 23, 2017 in corresponding Russian Federation Patent Application No. 2014137002/05(059920) (with English translation) (total 15 pages).

* cited by examiner

METHOD AND DEVICE FOR REDUCING IRON OXIDE-CONTAINING FEEDSTOCKS

CROSS-REFERENCE TO RELATED APPLICATIONS

The present application is a 35 U.S.C. §371 national phase conversion of PCT/EP2013/050789, filed Jan. 17, 2013, which claims priority of European Patent Application No. 12155090.9, filed Feb. 13, 2012, the contents of which are incorporated by reference herein. The PCT International Application was published in the German language.

TECHNICAL FIELD

The invention relates to a method for reducing iron-oxide-containing feedstocks, in which a reducing gas is supplied to a reducing unit containing the iron-oxide-containing feedstocks. The reducing gas is generated by a process gas having reduction potential being heated in a heating appliance to a temperature suitable for reducing the iron-oxide-containing feedstocks, in particular to a temperature of greater than 800° C. The known heating of the process gas in the heating appliance is performed by means of direct heat exchange of the process gas with combustion products formed in the heating appliance by combustion.

The invention also relates to a device for the performance of the method, comprising a reducing unit with a top gas discharge line for discharging top gas from the reducing unit, a heating appliance heats a process gas. The appliance includes a reduction gas line that discharges into the reducing unit, at least one fuel gas supply line supplies fuel gas that discharges into the heating appliance, an oxygen supply line supplies technically pure oxygen and at least one process gas supply line supplies the process gas.

PRIOR ART

For reducing iron-oxide-containing feedstocks in a reducing unit, the prior art discloses separating out a large part of the $CO_2$ contained in $CO_2$-containing gas by means of a $CO_2$ separating appliance in order to obtain from the previously $CO_2$ containing gas a process gas having reduction potential. This means that, after the separation of the $CO_2$, the process gas has a high content of CO or $H_2$ and, when the $CO_2$ or $H_2$ comes into contact with iron-oxide-containing feedstocks, it reduces the iron-oxide-containing feedstocks and at the same time is itself oxidized. The temperature of the process gas withdrawn from the $CO_2$ separating appliance is usually approximately 40° C.

To ensure reduction of the iron-oxide-containing feedstocks in the reducing unit takes place sufficiently quickly, prior to its being supplied as reducing gas into the reducing unit, the process gas should be heated to approximately 800° C. This heating frequently takes place when a first partial amount of the process gas flows through a heating appliance and a second partial amount of the process gas is supplied to the heating appliance as fuel gas. In this case, the fuel gas is burned with the addition of an oxygen-containing gas. The heat energy formed during this combustion is transferred by direct heat exchange to the first partial amount of the process gas, wherein the first partial amount of the process gas that flows through the heating appliance is withdrawn as reducing gas at a temperature suitable for reducing the iron-oxide-containing feedstocks.

Due to the preceding $CO_2$ separation, the process gas supplied to the heating appliance has a high content of CO or $H_2$ gas, and therefore in principle has a high reduction potential. It is in principle because the temperature of the process gas is too low for a high-speed reduction reaction to take place. The second partial amount of the process gas, which is supplied to the heating appliance as fuel gas, is oxidized during combustion with the oxygen-containing gas, so that the high content of CO in this fuel gas is oxidized by oxidation with the oxygen-containing gas to form $CO_2$. This causes a considerable amount of CO with a reduction capability to be withdrawn from the second partial amount of the process gas. Viewed overall, therefore, the amount of constituents with a reducing capability in the reducing gas withdrawn from the heating appliance is lower than it is in the entire amount of process gas, which is supplied to the heating appliance. Hence, the heating of the process gas performed by means of the above method takes place at the expense of the reduction potential of the process gas and is therefore disadvantageous with respect to the reduction of iron-oxide-containing feedstocks in a reducing unit.

The oxygen-containing gas supplied to the fuel gas is frequently air since air is cheaper and always available in greater quantities than pure oxygen or gas mixtures with a higher content of oxygen than air. The combustion of the fuel gas with air is, therefore, frequently a preferred variant with a method of this kind. However, air contains a high proportion of nitrogen. During combustion with the fuel gas, this nitrogen in the air is partially oxidized to form nitrogen oxides. Therefore, the reducing gas withdrawn from the heating appliance contains a proportion of nitrogen, which does not have a reduction potential. Therefore, these nitrogen contents do not participate in the reduction of the iron-oxide-containing feedstock. The sole property effected by these nitrogen contents in this context is that they adopt a specific volume content in the reducing gas and therefore reduce the proportion of contents with a reducing capability per volume unit of reducing gas. Therefore, compared to reducing gas without a nitrogen content, higher quantities of reducing gas are necessary in order to obtain the same amount of reduced feedstocks per time unit in the reducing unit.

It is known from the prior art that the object described can be achieved by withdrawing the nitrogen from the nitrogen-containing reducing gas prior to introduction of the reducing gas into the reducing unit. This has the drawback that additional appliances for separating nitrogen from gases are required and these are expensive and have to be maintained. Frequently, after consumption during the reduction of the iron-oxide-containing feedstocks in the reducing unit, nitrogen-containing reducing gas supplied to the reducing unit is withdrawn therefrom again as top gas and discharged into the environment. This can create problems with the observance of environmental regulations.

If, instead of air, technically pure oxygen is added to the fuel gas, a significant drawback results from the fact that technically pure oxygen is expensive and always has to be present in sufficient quantities in order to ensure a specific output of reduced feedstocks per time unit in the reducing unit.

SUMMARY OF THE INVENTION

Technical object

Therefore, the object of the invention is to provide a method for reducing iron-oxide-containing feedstocks in which the reduction potential of a process gas containing CO or $H_2$ is retained during the heating to form a reducing gas and the required quantity of technically pure oxygen required during the heating of the process gas and/or the nitrogen content in the reducing gas is reduced, wherein simultaneously the economic efficiency of the method is better than that of the prior art.

It is a further object of the invention to provide a device for the performance of the method.

Technical Solution

The object is achieved by a method for reducing iron-oxide-containing feedstocks. A reducing gas is supplied to a reducing unit containing the iron-oxide-containing feedstocks. The reducing gas is generated by introducing a process gas having reduction potential into a heating appliance to heat the process gas and then withdrawing the process gas as reducing gas from the heating appliance. In the heating appliance, heat energy is transferred to the process gas. The heat energy is formed in the heating appliance by combustion of a fuel gas containing organic substances, which gas comprises a coke oven gas originating from a system for producing coke with the addition of technically pure oxygen. The flame resulting from the combustion has an adiabatic flame temperature greater than 1000° C., preferably greater than 1300° C., particularly preferably greater than 1500° C., such that during the combustion of the fuel gas at least some of the organic substances present in the fuel gas are cracked and the heat energy is transferred to the process gas by mixing the process gas with the combustion products formed during the combustion of the fuel gas.

The reducing unit can in particular be embodied as a direct reducing unit with a fluidized-bed method or solid process method or as a blast furnace.

Although the process gas does have reduction potential, which means the content of CO and/or H2 is high enough to enable reduction of iron-oxide-containing feedstocks, it frequently has a low temperature. Therefore, prior to its introduction into the reducing unit, the process gas is introduced into the heating appliance for heating, from which the process gas is withdrawn as reducing gas and supplied to the reducing unit. The process gas can, for example, be export gas from a plant for the production of pig iron and/or steel intermediate products.

In addition to the process gas, the heating appliance is also supplied with fuel gas which contains organic substances. The fuel gas is burned with the addition of technically pure oxygen. The heat energy generated thereby is transferred by direct heat exchange to the process gas in that the combustion products formed during the combustion transfer their pulse to the process gas. The flame formed during the combustion has an adiabatic flame temperature of greater than 1000° C., preferably greater than 1300° C., particularly preferably greater than 1500° C.

The adiabatic flame temperature is the term applied to the temperature resulting after the combustion process is completed when the mixture of fuel gas and technical oxygen during the combustion has not exchanged any heat with the environment. Since a flame is normally hotter that is environment, flames lose heat during combustion. Therefore, the actual flame temperature is below the adiabatic flame temperature.

If the chemical composition of the fuel gas and the technically pure oxygen is measured or known, the adiabatic flame temperature resulting during combustion can be calculated. Consequently, the adiabatic flame temperature can be set at a desired value by means of the mixing ratio of fuel gas and technically pure oxygen. In this respect, see for example, Stanley S. Grossel: "Deflagration and Detonation Flame Arresters", American Institute of Chemical Engineers, 2002, pages 55 et seq or "Chemical Engineering Thermodynamics", Universities Press (India), 2004, pages 137 et seq or E. Rathakrishnan: "Fundamentals of Engineering Thermodynamics, Second Edition", Prentice-Hall of India Private Limited, New Delhi, $6^{th}$ Edition, 2005, pages 407 et seq or Michael Liberman: "Introduction to Physics and Chemistry of Combustion", Springer, 2008, pages 50 et seq. For this, according to the invention, the chemical composition of the fuel gas and the technically pure oxygen may optionally be checked continuously and adjusted according to the desired adiabatic flame temperature.

The fuel gas comprises coke oven gas, but it can also comprise further gases, with gases with a low content of $CO_2$ and/or $H_2O$ and a high content of CO, $H_2$, $CH_4$ and/or other organic substances being preferred. Generally, these gases should contain a high content of substances with a high calorific value. This is important in order to achieve an adiabatic flame temperature of greater than 1000° C., preferably greater than 1300° C., particularly preferably greater than 1500° C. during the combustion of fuel gas with technically pure oxygen. Preferably, the content of the coke oven gas in the fuel gas increases gradually after the plant has been started to up to 80%, particularly preferably up to 90%, even more preferably up to 99%. During the operation of the plant, the fuel gas can also exclusively comprise coke oven gas, which means the content of the coke oven gas in the fuel gas is 100%.

Coke oven gas is a gas, which is exported or withdrawn from a system for producing coke, in particular a coking plant and contains oxygen in molecular form ($O_2$).

This has the advantage that less technically pure oxygen has to be added to the fuel gas during combustion in the heating appliance. The use of coke oven gas to supply oxygen enables economic use or reutilization of the coke oven gas.

However, in addition to oxygen, coke oven gas also contains a high content of organic substances such as gaseous hydrocarbons, gaseous aromatic hydrocarbons, in particular BTX gases (benzene, toluene, ethyl benzene, xylenes), tars and further gaseous or fine-particle components, which are not wanted in the method described. For example, these components stick to the internal surfaces of lines carrying coke oven gas, they accumulate on the internal surfaces of plants for storing coke oven gas or processing coke oven gas. In the event of incomplete combustion in the heating appliances, these components of the coke oven gas used as fuel gas in the heating appliance can, for example, condense and result in caking or clumping in the heating appliance and/or in lines downstream of the heating appliance. In addition, incompletely burned components are transported with the reducing gas withdrawn from the heating appliance into the reducing unit and can cause damage there, for example due to caking or clumping. Here, incompletely burned means that the unwanted components present in the coke oven gas or fuel gas are present after combustion in a state such that there is a risk of damage due to caking, agglutination and/or clumping.

The flame formed during the combustion has an adiabatic flame temperature of greater than 1000° C., preferably greater than 1300° C., particularly preferably greater than 1500° C.

Due to this high adiabatic flame temperature, a large part of the unwanted components present in the fuel gas is completely burned during combustion. This means that after combustion, the unwanted components are present in a state in which to a large extent there is no longer a risk of damage due to caking, agglutination and/or caking. The unwanted components, in particular long hydrocarbons, are at least partially cracked during combustion. These combustion products formed thereby have the property of bonding with other substances, in particular with the process gas introduced into the heating appliance, which results in an optimal mixture of the process gas with the combustion products formed during the combustion of the fuel gas. A further advantage resulting from this property of the combustion products is that the reaction pathways are kept short. The reaction pathway is the pathway required on average by the combustion products until they bond with the process gas or with the constituents of process gas. This ensures a rapid transfer of the heat energy to the process gas, in particular to the constituents of the process gas, by mixing the process gas with the combustion products formed during the combustion of the fuel gas.

The volume required for the mixture and correspondingly the cubic expansion and/or the dimensions of the heating appliance can, therefore, be smaller than they are with similar heating appliances known from the prior art.

The coke oven gas can, therefore, at least partially, be used directly as fuel gas in the heating appliance without any preceding, complicated and expensive preparation with a low risk of damage from caking, agglutination and/or caking in the device according to the invention for reducing iron-oxide-containing feedstocks.

The reducing gas introduced into the reducing unit collides with iron-oxide-containing feedstocks or feedstocks that have already been reduced to iron. In this case, any unwanted components remaining in the reducing gas reaction react with the iron as a catalyst to form substances with which there is no longer any risk of caking and agglutination and/or clumping in the device according to the invention.

A preferred embodiment of the invention is characterized in that the process gas originates from a $CO_2$ separating appliance.

The $CO_2$ separating appliance is for example a PSA device (pressure swing adsorption), a VPSA-device (vacuum pressure swing adsorption) or a device for separating gas mixtures by means of membrane technique and/or chemical reaction. The process gas originating from the $CO_2$ separating appliance has reduction potential, this means that the process gas has a high content of CO and/or $H_2$ and is able, therefore, to reduce the iron-oxide-containing feedstocks to iron. The CO2 separating appliance is supplied with a $CO_2$-containing feed gas, which after the separation of at least a partial amount of the $CO_2$ contained in the feed gas, is withdrawn as process gas from the $CO_2$ separating appliance. The feed gas is, for example, a $CO_2$-containing export gas originating from a plant for the production of pig iron and/or steel intermediate products. In particular, the plant can be a COREX® plant, a FINEX® plant, a smelting reduction unit, a shaft reactor for reducing iron-oxide-containing substances, a blast furnace, a fluidized-bed reactor or a solid-bed reduction reactor or even a direct reduction plant. The separation of the $CO_2$ from the feed gas results in the formation, on the one hand, of process gas with a lower content of $CO_2$ than the feed gas and, on the other, of residual gas with a higher content of $CO_2$ than the feed gas.

This embodiment offers the advantage that export gas with a original reduction potential that is too low for the reduction of iron-oxide-containing feedstocks can, after separation of $CO_2$ from the export gas, be re-used as reducing gas in a reducing unit for reducing iron-oxide-containing feedstocks.

A preferred embodiment of the invention is characterized in that the fuel gas comprises at least a partial amount of the process gas.

Before being supplied to the heating appliance, at least a partial amount of the process gas originating from the $CO_2$ separating appliance is mixed into the fuel gas. Although in this case, during the combustion of the fuel gas in the heating appliance, the reduction potential of the partial amount of the process gas mixed into the fuel gas is reduced, this preferred embodiment, however, has the great advantage that quantities and/or pressure fluctuations of the coke oven gas can be compensated without great effort by varying the amount of the partial amount of the process gas mixed in and hence creating constant ratios throughout the entire method, in particular during the reduction of the iron-oxide-containing feedstocks in the reducing unit. It also has the advantage that the amount of process gas mixed into the fuel gas comprising coke oven gas causes the ignition temperature of the fuel gas to fall below the temperature of the fuel gas.

A further preferred embodiment is characterized in that the fuel gas consists of coke oven gas.

All the process gas is heated up in the heating appliance without its reduction potential being significantly reduced since it is not burned with oxygen in the heating appliance. All the process gas is mixed in the heating appliance with the combustion products formed during the combustion of the coke oven gas and not burned.

This has the advantage that the entire existing reduction potential of process gas is also available in the reducing gas withdrawn from the heating appliance and virtually the entire reduction potential can be used during the reduction of the iron-oxide-containing feedstocks in the reducing unit.

A further embodiment of the invention consists in the fact that at least a partial amount of the process gas is subjected to preheating by indirect heat exchange prior to introduction into the heating appliance. If process gas that has already been preheated is introduced into the heating appliance, at the given temperature of the reducing gas, the temperature difference to be "overcome" is lower than the temperature difference between a non-preheated process gas and the temperature of the reducing gas.

This has the advantage that less fuel gas needs to be used for the heating of the process gas or a lower-quality fuel gas, in particular with a lower content of combustible components, can be used.

A further embodiment of the invention is characterized in that the fuel gas and/or the technically pure oxygen are subjected to preheating by indirect heat exchange prior to the combustion of the fuel gas in the heating appliance.

A embodiment of the invention consists in the fact that the partial amount of the process gas is preheated to a temperature greater than 300° C., preferably greater than 400° C., even more preferably greater than 600° C.

If the preheating is performed by means of indirect heat exchangers with metallic conductors, at the temperatures named, no so-called "metal dusting" takes place or if it does, it only takes place to a very small extent. "Metal dusting" should be understood to mean the destruction of metallic substances, for example the metallic conductors of the indirect heat exchanger due to contact with carbon-monoxide-containing substances.

A further embodiment of the invention is obtained if the reducing gas withdrawn from the heating appliance has a temperature of greater than 750° C., preferably greater than 830° C., particularly preferably greater than 850° C.

If the reducing gas with the named temperatures is introduced into the reducing unit, optimal reduction of the iron-oxide-containing feedstocks in the reducing unit is ensured.

One embodiment is characterized in that the coke oven gas is subjected to a cleaning process prior to its combustion in the heating appliance.

The cleaning process consists in particular of coarse cleaning, in particular of dry or wet dust precipitation. Hence, this results in the advantage that larger solid particles entrained with the flow of coke oven gas are removed from the flow of coke oven gas and for this reason there is no negative impact on subsequent appliances and plants of the described method.

A further preferred embodiment of the invention is characterized in that the reducing gas consumed during the reduction of the iron-oxide-containing feedstocks in the reducing unit is withdrawn as top gas and the preheating of the partial amount of the process gas is performed by indirect heat exchange with at least a partial amount of the top gas and/or with residual gas that forms in the $CO_2$ separating appliance and/or with a mixture of the partial amount of the withdrawn top gas and the residual gas and/or with a partial amount of the feed gas.

If $CO_2$-containing gas is supplied to the $CO_2$ separating appliance, the separation of $CO_2$ from this supplied gas will cause, on the one hand, the process gas to be generated with a lower content of $CO_2$ than the supplied gas and, on the other, the residual gas to be generated with a higher content of $CO_2$ than the supplied gas, wherein immediately after the $CO_2$ separating appliance, the residual gas can have a higher temperature than the process gas. The sensible heat of the top gas and/or of the residual gas and/or of the mixture of top gas and residual gas and/or the feed gas is used in this indirect heat exchange process to heat the partial amount of the process gas, which results in the advantage that less energy from other sources has to be used for the preheating.

A preferred embodiment of the invention consists in the fact that the reducing gas withdrawn from the heating appliance is subjected to partial combustion with technically pure oxygen and/or the fuel gas prior to being supplied to the reducing unit.

In this case, part of the reducing gas is burned with the addition of technically pure oxygen, which results in the advantage that the temperature of the reducing gas can be briefly adjusted to match the conditions in the reducing unit, in particular fine-tuned. Hence, for example, the temperature of the reducing gas can be raised by least 20° C., preferably by at least 30° C., even more preferably by at least 40° C. This makes it possible to react quickly to fluctuations in the reducing unit, for example to fluctuations in the quantity of iron-oxide-containing feedstocks located in the reducing unit.

A further subject matter of the invention is a device for the performance of the method comprising a reducing unit with a top gas discharge line for discharging top gas from the reducing unit, a heating appliance for heating up a process gas with a reduction gas line that discharges into the reducing unit and in each case with at least one fuel gas supply line that discharges into the heating appliance for supplying fuel gas, an oxygen supply line for supplying technically pure oxygen and a first process gas supply line for supplying at least one first partial amount of a process gas, wherein the fuel gas supply line originates from a system for producing coke, in particular a coking plant and/or from a plant for storing coke oven gas, in particular a gasometer.

Here, positional details such as "before" or "after" always mean viewed in the direction of the flow velocity of the gas in question, in particular the fuel gas, the top gas, the reducing gas, the residual gas and the gas mixture.

Optionally, appliances for influencing the pressure and/or for influencing the quantity of the gases flowing in the corresponding lines are provided in one or more of the lines named. These appliances for influencing the pressure and/or for influencing the quantity can in particular be pressure valves, pressure regulating valves or compressors.

For the purpose of this invention, technically pure oxygen should be understood to be a gas mixture with an oxygen content of more than 50%, preferably more than 80%, even more preferably more than 90%, quite particularly preferably more than 99%. The fuel gas supply line can originate from all types of plant, in which coke oven gas is produced, stored, processed or consumed.

Frequently, coke oven gas of this kind is simply burned, without using the energy contained therein in a further method, in particular a method for reducing iron-oxide-containing feedstocks.

The advantage of the device according to the invention is that coke oven gas that forms or is stored in the system for producing coke and/or in the plant for storing coke oven gas can be used in a method for reducing iron-oxide-containing feedstocks, possibly after preparation by combustion.

A preferred embodiment of the invention is characterized in that, a $CO_2$ separating appliance for separating $CO_2$ from a feed gas introduced via a feed gas line is arranged in the process gas supply line.

One embodiment of the invention is characterized in that a second process gas supply line that discharges into the fuel gas supply line is provided for supplying at least a second partial amount of the process gas originating from the $CO_2$ separating appliance.

The fuel gas line in particular connects the first process gas line directly with the fuel gas line. Optionally, an appliance for influencing the pressure and/or the quantity of the process gas in the second process gas line is provided in the second process gas line. Such a device is particularly suitable, for [words missing] the gas flowing in the corresponding lines.

A further embodiment of the invention comprises an appliance for preheating the first partial amount of the process gas arranged in the first process gas supply line. This appliance for preheating the first partial amount of the process gas is in particular embodied as an appliance for indirect heat exchange.

Another embodiment of the invention comprises a cleaning appliance for cleaning gases provided in the fuel gas supply line, before the second process gas supply line that discharges into the fuel gas supply line. The cleaning appliance can in particular be an appliance for wet dust precipitation or dry dust precipitation. The cleaning appliance is suitable for filtering at least coarse solid particles out of the gas flowing through the cleaning appliance.

In a further preferred embodiment, a top gas supply line for supplying at least a partial amount of the top gas and/or a residual gas supply line for supplying a residual gas originating from the $CO_2$ separating appliance and/or a supply line for supplying a mixture of the partial amount of the top gas and the residual gas discharges into the appliance for preheating the first partial amount of the process gas.

This embodiment of the device according to the invention enables the sensible heat of the top gas and/or the residual gas and/or of the mixture of the partial amount of top gas and of residual gas to be used to preheat the first partial amount of the process gas. If the appliance for preheating the first partial amount of the process gas is an appliance for indirect heat exchange, this has the advantage that if there are leaks due to abrasion in the first process gas line in the heat exchanger, there is no risk of the process gas igniting.

A preferred embodiment is characterized in that an appliance for influencing the temperature and/or the chemical composition of the reducing gas is arranged in the reduction gas line. This device can be used to adjust the temperature of the reducing gas, in particular increase the temperature, before supplying the reducing gas to the reducing unit, in order to ensure an optimal temperature of the reducing gas for reducing the iron-oxide-containing feedstocks. In this case, for example, the temperature of the reducing gas can be raised by at least 20° C., preferably by at least 30° C., even more preferably by at least 40° C. This makes it possible to react quickly to fluctuations in the reducing unit, for example to fluctuations in the quantity of iron-oxide-containing feedstocks located in the reducing unit.

A further subject matter of the invention is the use of the device for the performance of the above-described method.

BRIEF DESCRIPTION OF THE DRAWINGS

The invention is explained below in an exemplary manner with reference to the attached figures.

DESCRIPTION OF THE EMBODIMENTS

Figure 1:
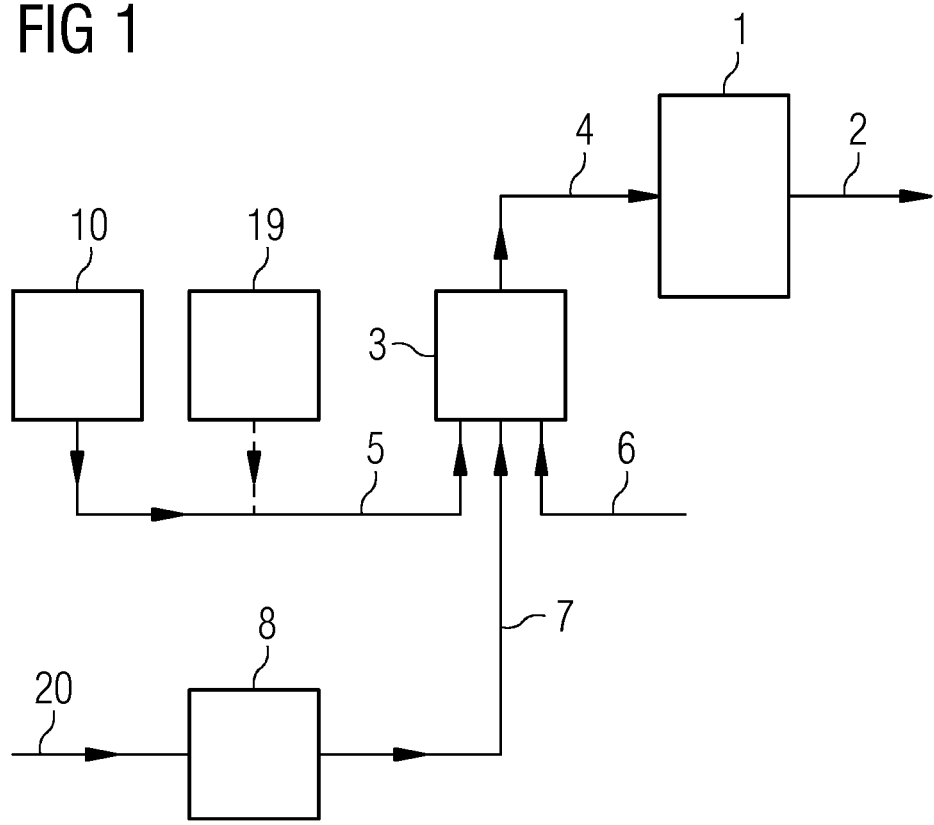
FIG. 1 is an exemplary and schematic illustration of a method according to the invention and a device according to the invention for reducing iron-oxide-containing feedstocks.

FIG. 1 shows an exemplary and schematic diagram of a method and a device for reducing iron-oxide-containing feedstocks comprising the method according to the invention and the device according to the invention.

The arrows in FIG. 1 identify the respective actual and/or possible flow directions of the gas flows that occur in the device according to the invention in a conventional operating status of the device or the method.

In the method according to the invention, a reducing gas is supplied via a reduction gas line (4) to a reducing unit (1). The reducing gas supplied flows through the reducing unit (1) and at the same time the iron-oxide-containing feedstocks located in the reducing unit (1) are reduced. During this, the reducing gas is consumed and discharged from the reducing unit (1) as top gas via the top gas discharge line (2). The reducing gas is generated by introducing feed gas via a feed gas line (20) into a $CO_2$ separating appliance (8) and withdrawing the gas from this appliance as process gas this via a first process gas supply line (7). The process gas is introduced into the heating appliance (3) via the first process gas supply line (7) discharging into a heating appliance (3). The heating appliance (3) is also supplied with fuel gas via the fuel gas supply line (5) and technically pure oxygen via the oxygen supply line (6). In the heating appliance (3), the fuel gas is burned with the addition of the technically pure oxygen. The flame resulting from the combustion has, for example, an adiabatic flame temperature of greater than 1000° C. In the heating appliance (3), the introduced process gas is mixed with the combustion products formed during the combustion of the fuel gas. At the same time, the process gas introduced into the heating appliance (3) is heated up and withdrawn from the heating appliance (3) as reducing gas via the reduction gas line (4). The process gas is typically introduced into the heating appliance (3) at a temperature of greater than 300° C. and is withdrawn therefrom as reducing gas with a temperature of greater than 800° C. The fuel gas introduced into the heating appliance (3) originates, for example, in a plant (10) for producing coke, in particular a coking plant and/or from a plant (19) for storing coke oven gas, in particular a gasometer.

Figure 2:
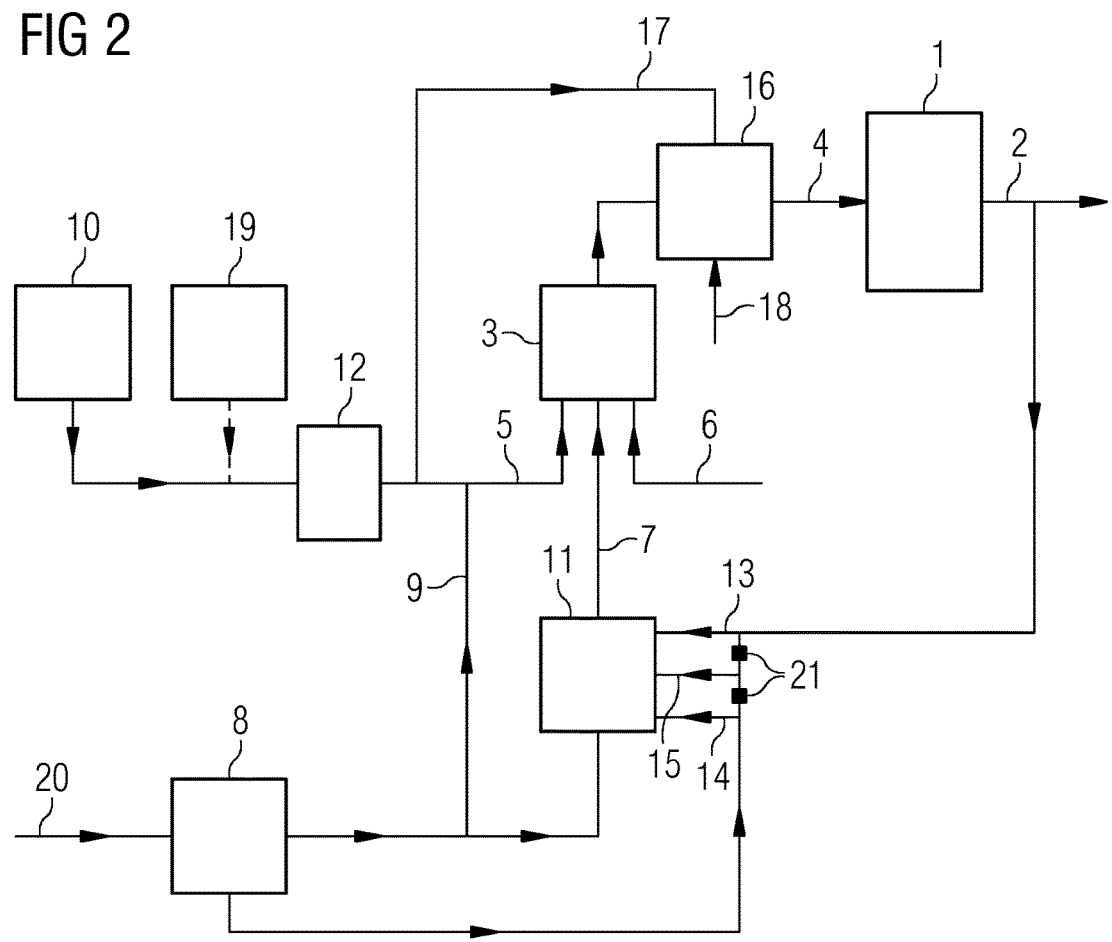
FIG. 2 shows an optional advantageous embodiment of a method according to the invention and an optional advantageous device according to the invention for reducing iron-oxide-containing feedstocks.

FIG. 2 is an exemplary and schematic diagram of an optional embodiment of the method and an optional advantageous embodiment of the device for reducing iron-oxide-containing feedstocks which comprises the method according to the invention and the device according to the invention.

The arrows in FIG. 2 identify the respective actual and/or possible flow directions of the gas flows in the device according to the invention in a conventional operating status of the device or the method of the invention.

A further embodiment of the invention is characterized in that a partial amount of the process gas is supplied to the fuel gas via a second process gas supply line (9) prior to the combustion in the heating appliance (3). The fuel gas is burned in the heating appliance (3) with the addition of the technically pure oxygen. Here, partial amount of the process gas supplied to the heating appliance (3) via the first process gas supply line (7) is, for example, heated to 800° C. and withdrawn from the heating appliance (3) as reducing gas via the reduction gas line (4). Before the reducing gas is supplied to the reducing unit (1), the reducing gas is heated in a device (16) for influencing the temperature and/or the chemical composition of the reducing gas, for example from 800° C. to 830° C. The heating is performed by partially burning the reduction gas supplied to the device (16) for influencing the temperature and/or the chemical composition of the reducing gas with a technically pure oxygen introduced via a oxidation gas supply line (18) and/or with a fuel gas introduced via a second fuel gas supply line (17). The fuel gas is for example coke oven gas, which is introduced directly into the heating appliance (3) via the second fuel gas supply line (17).

A cleaning appliance for cleaning gases, for example a filter, arranged in the fuel gas supply line (5), is arranged before the discharge of the second process gas supply line (9) into the fuel gas supply line (5) and before the second fuel gas supply line (17) originating from the fuel gas supply line (5). This filter is used for the coarse separation of solid particles from the fuel gas. The fuel gas line (5) originates from a plant (10) for the production of coke, for example a coking plant, and/or a plant (19) for storing coke oven gas, for example to a gasometer. Prior to being supplied, the partial amount of the process gas supplied to the heating appliance (3) via the first process gas supply line (7) is heated in a appliance (11) for preheating the first partial amount of the process gas by indirect heat exchange for example to a temperature of more than 300° C. The reducing gas supplied to the reducing unit (1) is discharged from the reducing unit (1) as top gas via the top gas line (2) and a partial amount of the withdrawn top gas is supplied to the appliance (11) for preheating the first partial amount of the process gas via the top gas supply line (13). Optionally, a residual gas formed during the separation of the $CO_2$ from the feed gas in the $CO_2$ separating appliance (8) is supplied via the residual gas supply line (14) to the appliance (11) for preheating the first part partial amount of the process gas. A further option is provided if a mixture of top gas and residual gas is supplied to the appliance (11) for preheating the first partial amount of the process gas via the supply line (15) for supplying a gas mixture. These different options for supply are controlled via control valves (21). Indirect heat exchange is performed via a heat exchange of the top gas and/or the residual gas and/or the mixture of top gas and residual gas with the partial amount of the process gas flowing through the appliance (11) for preheating the first partial amount of the process gas.

Although the invention was illustrated in more detail by the preferred exemplary embodiments, the invention is not restricted by the disclosed examples and other variations can be derived by the person skilled in the art without departing from the scope of the invention.

LIST OF REFERENCE NUMBERS

1 Reducing unit
2 Top gas discharge line
3 Heating appliance
4 Reduction gas line
5 Fuel gas supply line
6 Oxygen supply line
7 First process gas supply line
8 $CO_2$ separating appliance
9 Second process gas supply line
10 System for producing coke
11 Appliance for preheating the first partial amount of the process gas
12 Cleaning appliance for cleaning gases
13 Top gas supply line
14 Residual gas supply line
15 Supply line for supplying a gas mixture
16 Appliance for influencing the temperature and/or the chemical composition of the reducing gas
17 Second fuel gas supply line
18 Oxidation gas supply line
19 Plant for storing coke oven gas
20 Feed gas line
21 Control valves

The invention claimed is:

1. A method for reducing iron-oxide-containing feedstocks, comprising:
supplying a reducing gas to a reducing unit containing the iron-oxide-containing feedstocks;
generating the reducing gas by introducing a process gas having reduction potential into a heating appliance, heating the process gas in the heating appliance and withdrawing the process gas as the reducing gas from the heating appliance, during which heat energy is transferred to the process gas; and
forming the heat energy in the heating appliance by combustion of a fuel gas containing coke oven gas having at least some crackable organic substances, while adding technically pure oxygen, such that a flame results from the combustion and the flame has an adiabatic flame temperature greater than 1000° C.;
subjecting the coke oven as to a cleaning process prior to combustion of the coke oven gas in the heating appliance;
wherein the at least some organic substances present in the fuel gas are cracked, and wherein the heat energy is transferred to the process gas in a direct heat exchange by mixing, in the heating appliance, the process gas with the combustion products formed during the combustion of the fuel gas.

2. The method as claimed in claim 1, further comprising originating the process gas from a $CO_2$ separating appliance.

3. The method as claimed in claim 1, wherein the fuel gas comprises at least a partial amount of the process gas.

4. The method as claimed in claim 1, further comprising subjecting at least a partial amount of the process gas to preheating by heat exchange prior to introduction of the at least partial amount of the process gas into the heating appliance.

5. The method as claimed in claim 1, further comprising preheating the fuel gas and/or the technically pure oxygen by heat exchange prior to the combustion of the fuel gas in the heating appliance.

6. The method as claimed claim 4, further comprising preheating the partial amount of the process gas to a temperature greater than 300° C.

7. The method as claimed in claim 1, further comprising withdrawing the reducing gas from the heating appliance at a temperature of the gas greater than 750° C.

8. The method as claimed in claim 4, further comprising consuming the reducing gas during the reduction of the iron-oxide-containing feedstocks in the reducing unit and withdrawing the reduction gas as top gas, and the preheating of the partial amount of the process gas is performed by heat exchange with at least a partial amount of the top gas and/or with a residual gas that forms in the $CO_2$ separating appliance and/or with a mixture of the partial amount of the withdrawn top gas and the residual gas.

9. The method as claimed in claim 1, further comprising, prior to being supplied to the reducing unit, subjecting the reducing gas withdrawn from the heating appliance to partial combustion with technically pure oxygen and/or the fuel gas.

* * * * *